United States Patent [19]
Cummings et al.

[11] 4,444,217
[45] Apr. 24, 1984

[54] AUTOMATIC DRAIN TRAP

[75] Inventors: Ernest W. Cummings, Concord; Nick Valk, Greeneville, both of Tenn.

[73] Assignee: Drain-All, Inc., Greeneville, Tenn.

[21] Appl. No.: 299,966

[22] Filed: Sep. 8, 1981

[51] Int. Cl.³ .............................................. F16K 31/34
[52] U.S. Cl. ..................................... 137/195; 137/413
[58] Field of Search ........................ 137/195, 413, 414

[56] References Cited
U.S. PATENT DOCUMENTS
3,980,457 9/1956 Smith .............................. 137/195 X Primary Examiner—Alan Cohan
Attorney, Agent, or Firm—Pitts, Ruderman & Kesterson

[57] ABSTRACT

An automatic drain system is provided for reservoirs used to accumulate water, condensables, and other foreign materials which may be present in pneumatic systems and the like. This drain system is associated with a reservoir wherein these contaminants are accumulated and is operated by a float within this reservoir. The principal operating items of the drain system are a pair of magnetically coupled magnets, one positioned within the float and the other within a valve plug of a pilot valve. These magnets normally have opposite polarities whereby the float, in its lowest position and as it rises within the reservoir, causes the valve plug to be maintained against the pilot valve seat. A separate pneumatic system attached to this pilot valve maintains a drain valve operator in a condition such that the drain valve from the reservoir is closed while the pilot valve components are in contact. When the float reaches its uppermost position, the magnet therein brings about an effective reversal of the polarity of the magnet in the valve plug causing the valve plug to be moved away from the pilot valve seat. When this occurs, the drain valve operator is moved in a direction such that the drain valve is rapidly opened permitting the complete draining of any material accumulated in the reservoir. When the float reaches its most downward position, the polarity of the magnet within the pilot valve plug is again effectively reversed and the pilot valve is closed to again close the drain valve.

13 Claims, 8 Drawing Figures

AUTOMATIC DRAIN TRAP

DESCRIPTION

1. Technical Field

This invention relates generally to float-activated drain systems for liquid reservoirs and more particularly to an automatic drain valve for traps used in the accumulation of condensable materials and other contaminants from pneumatic systems and the like.

2. Background Art

It is conventional to use filters and separators for removing foreign objects, and condensing and removing water and other condensable liquids, from pressurized air lines and the like. Typically, such filters include an air inlet, an air outlet and a filtering element mounted between these elements in the flow path. Such filters also include a reservoir or filter bowl through which the air flow is at least partially passed causing the moisture and other condensables in the air to be coalesced and condensed on the inside surface of the reservoir or bowl. The force of gravity causes such condensed materials to accumulate at the bottom of the reservoir together with any other foreign objects. Periodically, this accumulated material must be discharged when the reservoir or filter bowl has become full of material.

Numerous drain systems have been devised for the discharge of the accumulated material. Two such devices are shown in U.S. Pat. No. 3,980,457 issued to J. I. Smith on Sept. 14, 1974 and in U.S. Pat. No. 3,993,090 issued to Paul M. Hankison on Nov. 23, 1976. In the first of these two patents, there are a pair of valves, a pilot valve and a discharge valve. The pilot valve is magnetically operated and includes a float which moves in response to changes in the liquid level within the reservoir to magnetically open and close a fluid valve in response to that liquid level. Opening of the fluid valve may thereafter cause the opening of the second valve for other operations such as the drainage of the reservoir. In the second of the patents, there are also two valves, a pilot valve and a discharge valve. In this device, a float is held in a submerged condition for a time to create a superbuoyancy condition. When a sufficient superbuoyancy condition is acheived, the float suddenly rises to the surface of the liquid causing a snap action of the pilot valve. This opening of the pilot valve then quickly opens the discharge valve for the removal of material contained within the reservoir. In both of these patents, the pressure of the pneumatic system to which the trap is attached is the driving force which opens the discharge valve.

Since the operating valves and the drain valves are located within the reservoir, various disadvantages exist in the devices described in the above-identified patents. For example, the discharge valve or its operator may be damaged by, or may collect, dirt and other abrasive materials during the discharge operation. Also, they may be affected by corrosive action since they are in contact with the collected material. These deleterious conditions affect the future correct operation of the discharge valve. Further, since the discharge valve is located within the reservoir as part thereof, it is a difficult and expensive procedure to replace components of this discharge valve. Since the pilot valve also is operated by the air pressure of the pneumatic system to which the reservoir is connected, this valve may become contaminated with some of the impurities.

Still other of these known devices for accumulating condensables and impurities from pneumatic systems are described in the background sections of the above-identified patents, together with the disadvantages thereof.

Accordingly, it is an object of the present invention to provide a drain system for a reservoir utilized in the accumulation of condensables and impurities from pneumatic systems wherein the discharge valve is located externally to the reservoir to facilitate replacement of components if necessary.

It is another object of the present invention to provide a discharge valve for the reservoir which features a rapid shearing action during closure whereby dirt and other such impurities have negligible effect on valve operation and provides for a positive shut-off every cycle without leaks therefrom.

Another object of the present invention is to provide a pilot valve housed in a separate chamber integral with, but separate from, the main reservoir area where collected material is stored whereby the pilot valve is not affected by pressure, dirt and other contaminants which would cause most pilot valves to fail.

It is still another object to provide a drain system which utilizes a separate source of pressurized air to prevent against the contamination of the valve operators.

It is still another object of the present invention to utilize a pair of magnets of normally opposite polarity, one in a pilot valve plug and one in a float, that are magnetically coupled such that one of the magnets effectively reverses polarity when the float within a liquid reservoir reaches the uppermost position thereby providing a snap opening of the pilot valve. These magnets are so positioned that at the lowest level of the float, the magnet is again effectively reversed in polarity causing the rapid closing of the pilot valve.

Other objects and advantages of the invention will become apparent upon reading the hereinafter detailed description with reference to the drawings.

DISCLOSURE OF THE INVENTION

In accordance with the invention, an automatic drain valve system is provided for the discharge of accumulated condensed materials and other foreign matters from a reservoir when the reservoir is filled to a predetermined level. The valve for the actual draining is positioned externally to the reservoir together with its pneumatic operator. Filtered pressurized air, from a separate source, is fed to this operator and to a pilot valve isolated from, but within the reservoir itself. This pilot valve is normally maintained in a closed position by a pair of magnetically-coupled magnets, one being in the pilot valve plug and one in the float surrounding the pilot valve within the reservoir. The polarity of these magnets is chosen such that when the float is in the lowest position or is rising within the reservoir, the magnets oppose each other. This causes the valve plug to close against the pilot valve seat. When the float reaches its uppermost position, the relative polarity of one of the magnets is effectively reversed causing the valve plug to move away from the pilot valve seat thereby permitting pressurized air flow to the drain valve operator with the result that the drain valve is suddenly opened. This effective reversed polarity of one magnet persists until the float reaches its lowest position at which time the polarity effectively reverses. This reversal causes the valve plug to again move against the pilot valve seat and the air pressure to the drain valve operator is reversed causing the drain valve to suddenly close. The pressure at the pilot valve determines when the drain valve operator is to be moved from a closed to an open position and then returned to a closed position.

BEST MODE FOR CARRYING OUT THE INVENTION

Figure 1:
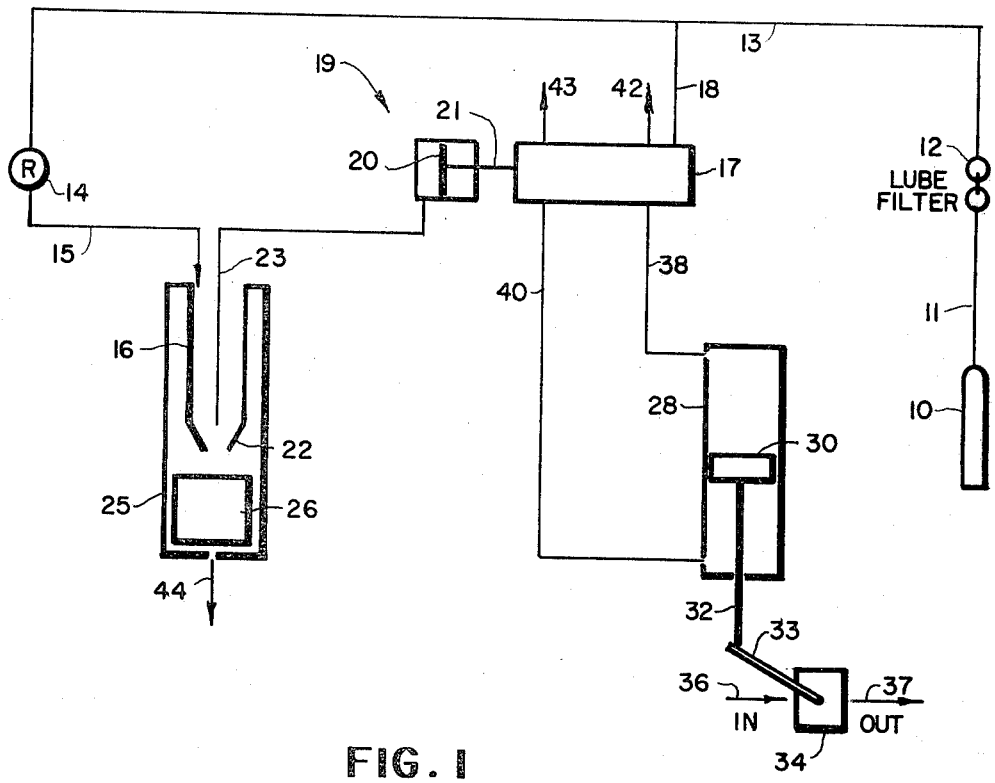
FIG. 1 is a schematic flow diagram of the pneumatic portion of the present invention.

Referring now to FIG. 1, a schematic flow diagram is shown for the pneumatic systems used to operate the present invention. Air from a pressurized source 10 is fed through line 11 to a conventional filter lubricator 12 and thence through line 13 to a regulator 14. The output (e.g. 5 psi) from the regulator 14 feeds through line 15 to the interior of proximity sensor tube 16. The tube 16 terminates in a valve seat 22. Filtered pressurized air is also fed to a multi-ported valve 17 through line 18. A typical low pressure valve for this application is Clippard Instrument Laboratory Model R-405. This valve 17 has an operator 19 which consists of a piston 20 and a piston rod 21. The volume above the piston 20 is connected by a line 23 to the center of the proximity sensor tube 16 adjacent the valve seat 22. Proximate the valve seat 22 is a valve plug 26. This valve plug 26 is either in contact with or displaced from the valve seat 22 by the method described hereinafter. As will be described below, the proximity sensor tube 16 and its valve seat 22 together with the valve plug 26 are contained within a separate closure 25.

External to the reservoir is a pneumatic cylinder 28 containing an axially-movable piston 30. This piston 30 is provided with a piston rod 32 extending through an end of the cylinder 28, and the outward end of the rod 32 is pivotally connected to a discharge valve operator arm 33 of valve 34. An inlet line 36 to valve 34 connects to a reservoir to be drained (not shown), and an outlet line 37 connects to any appropriate drain or catch basin. The cylinder 28 is provided with pneumatic lines 38, 40, one on either side of piston 30 which lines are connected to appropriate ports of the valve 17. The valve 17 is provided with vent lines 42, 43, respectively connectable to lines 38, 40. Also, enclosure 25 on the proximity valve components is provided with a vent line 44.

Figure 2:
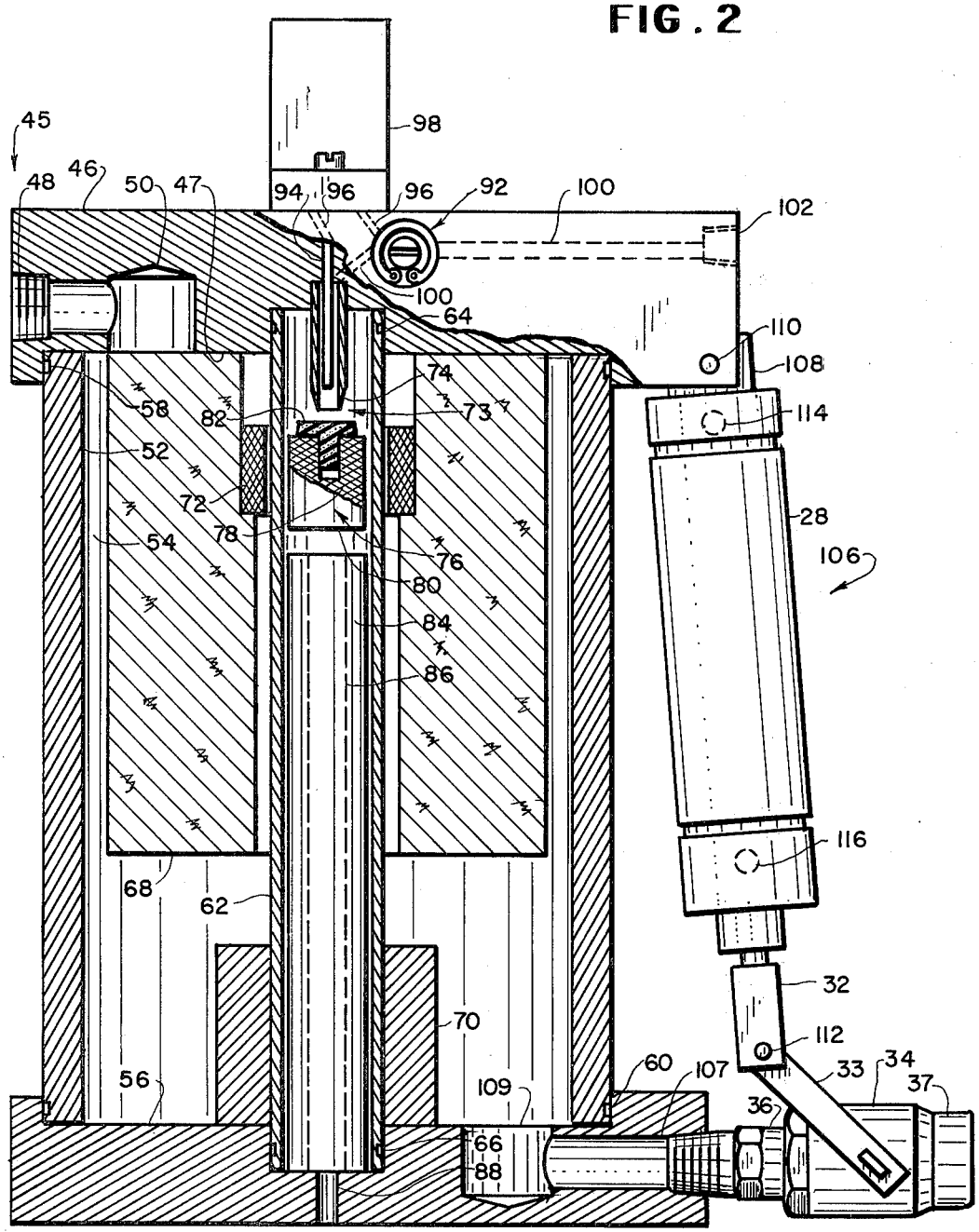
FIG. 2 is a vertical cross-sectional view of the present invention showing the pilot valve, the magnets, and the discharge valve and its operator.

A cross-sectional view of the present device for accumulating condensable materials and other foreign matters from a pneumatic system, together with means for draining the reservoir of this device, is shown in FIG. 2. A separator/reservoir 45 of this embodiment has a top housing 46 which is provided with an inlet 48 for connection to any pneumatic or other gas system from which condensables and foreign materials are to be removed. Formed within the lower face of the housing 46 is an arcuate channel 50 which serves as a moisture condenser/filter as condensables collect on the surface thereof. Depending from below the housing 46 is a cylindrical shell 52 which forms the wall of the reservoir. The bottom of the reservoir is formed from base plate 56, and seals 58, 60 are inserted between the shell 52 and the top housing and bottom plate, respectively. Axial bolts or other means are provided (see FIG. 7) for maintaining the sleeve 52 firmly clamped between the header 46 and the bottom plate 56. This structure creates a reservoir volume 54 as shown. The aforementioned channel 50 communicates with this reservoir volumn 54 whereby the volume 54 is used to collect the condensables and other materials that are removed from the pneumatic system. Mounted within the reservoir is a hollow cylinder 62 (corresponding to element 25 of FIG. 1) which is sealed to the upper housing 46 with an appropriate seal 64 and to the bottom plate 56 with an additional seal 66. Generally surrounding the cylinder 62 is a bouyant member 68 which is slidable along the cylinder 62 from a top position wherein the top of the bouyant member or float 68 is in contact with the under surface 47 of the housing 46, to a bottom position wherein the bottom surface of the float 68 rests against a float stop 70. The annular opening, which is sufficient to minimize the collection of foreign materials, within the float 68 may be provided with guides (not shown) to assist in the movement of the float between its most distant positions. Mounted within the top of the float or proximate thereto is an annular magnet 72 (e.g. $2 \times 1.3 \times 1$ in.) which encircles the cylinder 62.

Within the upper portion of the sleeve 62 is a proximity or pilot valve 73 which consists of a valve seat 74 and a valve plug 76 (equivalent to elements 22, 24 of FIG. 1). The valve plug 76 in turn consists of a cylindrical magnet 78 (e.g. $0.87 \times 1$ in.) encased in a protective layer 80. The top of the plug 76 is provided with a resilient cap or plug 82 for contact with the valve seat 74. Positioned beneath the valve plug 76 is a cylindrical stop in the form of a hollow cylinder 84 the purpose of which will be described hereinafter in connection with the relationships of the magnet 72 and 78. The stop 84 is provided with a central passageway 86 which communicates with an outlet passage 88 (vent 44 of FIG. 1) through the base plate 56. Filtered air is supplied to the interior of the pilot valve seat 74 through a tube 90 from regulator 92. Coxially mounted within the pilot valve 73 is a capillary tube 94 which communicates through passageway 96 to a four way valve 98 (the item 17 of FIG. 1). Air is supplied to the valve 98 and to the regulator 92 by means of an inlet 102 and a passageway 100. Although not shown in this figure, the valve 98 communicates with additional passageways in the header 46 for the purposes described hereinafter.

Shown at the right of FIG. 1 is a drain valve 34 and operator system 106. This operator system 106 is made up of the aforementioned cylinder 28 which is attached to the top header 46 with a yolk 108. The yolk is mounted to the top header with a pivot pin 110. Extending from the bottom of the cylinder 28 is the aforementioned piston rod 32 which is pivotally connected to a valve operator 33 of valve 34 with a pin 112. The valve 36, in turn, is connected to the bottom header 56 by a fitting 36. The fitting communicates with passageway 107 within the base plate 56, with this passageway communicating with a sump 109. The outlet from valve 34 leads through conduit 37 to an appropriate collection vessel for the products drained from the reservoir. Although not shown, pneumatic lines for the operation of the piston within the cylinder 28 are attached to the cylinder at ports 114 and 116. The purpose of these lines will be described hereinafter.

Figure 3:
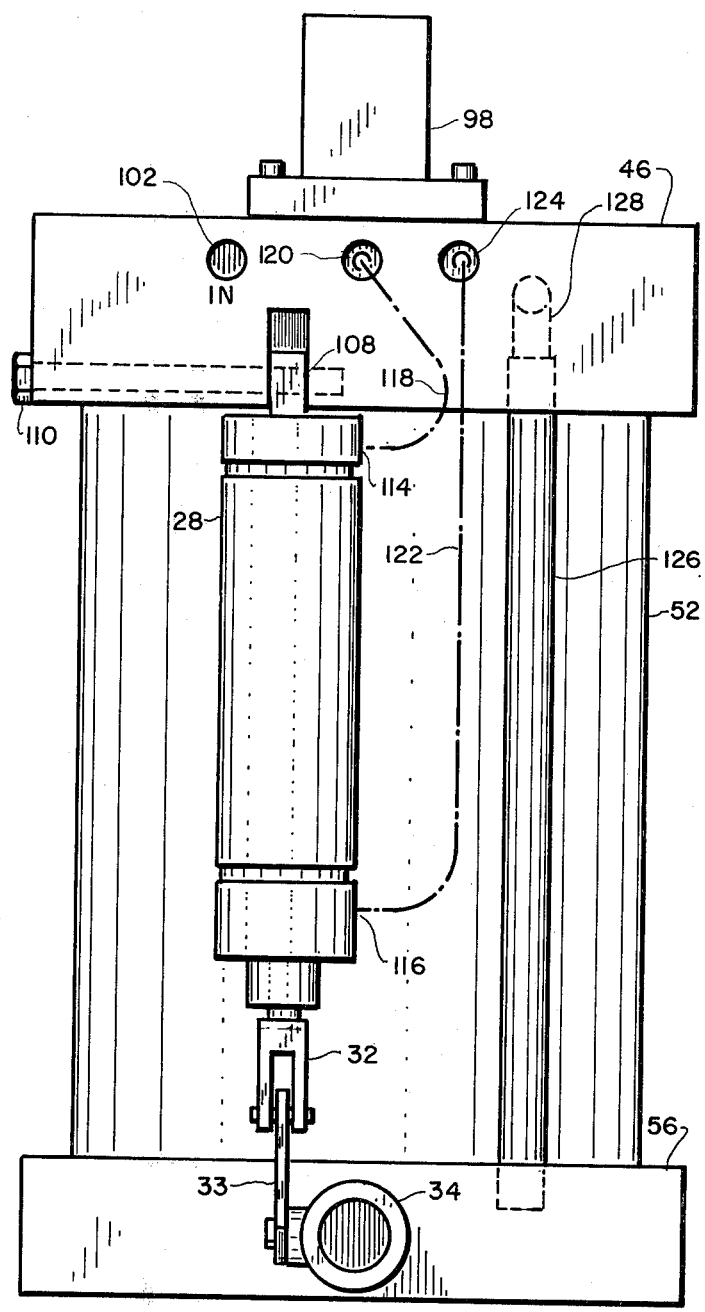
FIG. 3 is a plan view of the present invention taken at right angles to the view shown in FIG. 2.

A side elevational view of the subject invention is shown in FIG. 3. It may be seen that the inlet port 114 at the top of cylinder 28 is connected by a pneumatic line 118 (same as line 38 of FIG. 1) to a port 120 which communicates with the aforementioned valve 98 (FIG. 2). In a similar manner, the second port 116 at the bottom of cylinder 28 communicates through a pneumatic line 122 (same as line 40 of FIG. 1) to a port 124 in the top header 46 which, in turn, is likewise connected to the valve 98. This figure also shows an optional liquid level indicator line 126 which communicates with an internal passageway 128 to the internal volume 54 of the reservoir.

Referring again to FIG. 1, the pneumatic operation of the subject invention can be described with reference to this schematic drawing. Normally, pressurized air is fed from cylinder 10 or other appropriate source to the filter and lubricator 12 and then to the proximity valve 17 through corresponding lines 13 and 18. This low pressurize air is also admitted through line 13 and regulator 14 into the internal volume of the pilot valve seat 22 through line 15. When the valve plug 26 is firmly seated against the valve seat 22, the pressure existing in line 15 also exists in line 23 which is connected to the valve operator 19 of control valve 17. This pressure in line 23 causes the piston 20 and piston rod 21 to move the control valve 17 so as to provide a pressure through line 40 to the volume in cylinder 28 below the piston 30. At the same time, the volume above the piston 30 in the cylinder 28 is connected through line 38 to the exhaust line 42. This results in maintaining the piston 30 in an elevated position within the cylinder 28 and thus the piston rod 32 moves the valve operator 33 such that valve 34 is in a closed position. Thus, the line 36 from the reservoir is closed from the conduit 37. When, however, the valve plug 26 is displaced from the valve seat 22 in a manner to be described hereinafter, the air through line 15 entering the valve seat 22 is exhausted through line 44. Under these conditions, the pressure in line 23 is substantially reduced. This causes the valve 17 to reverse the air flow to the cylinder 28. Accordingly, air pressure is admitted to the cylinder 28 through line 38 and the volume below the piston 30 is exhausted through line 40 and vent line 43. This causes a downward movement of the piston 30 and the piston rod 32 which in turn moves the valve operator 33 to fully open the valve 34 thereby permitting full flow through line 36 to line 37 and thereby draining the reservoir. When the reservoir is fully drained, the pilot valve plug 26 again contacts the valve seat 22 and thereby the initial condition occurs whereby drain valve 34 is again closed.

Figure 4:
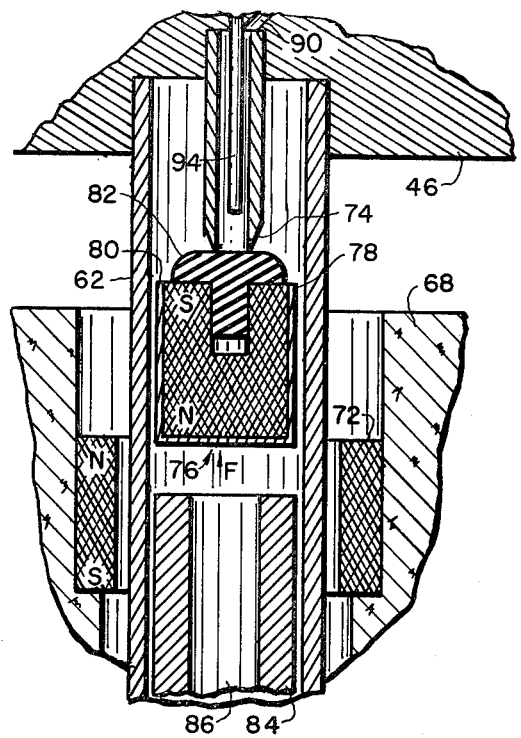
FIG. 4 is a fragmentary view of the pilot valve and the float of the present invention when the float is in the most downward position and is about to rise due to accumulation of condensable liquid in the reservoir.
Figure 5:
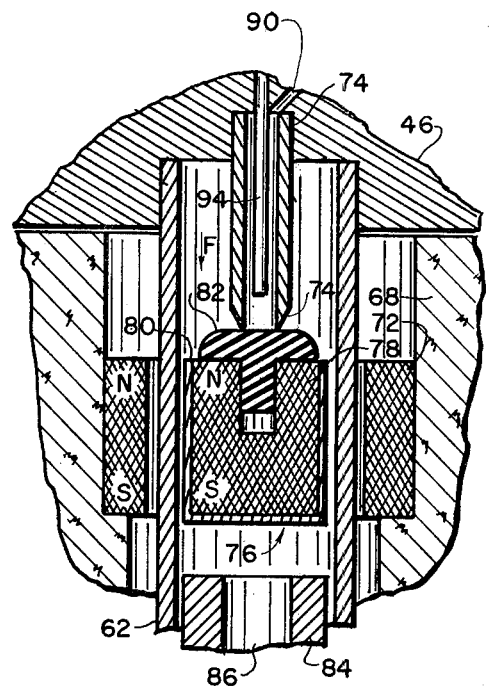
FIG. 5 is a fragmentary cross-sectional view of the present invention as the float reaches the uppermost position causing the reversal of the polarity of the magnet mounted within the valve plug.
Figure 6:
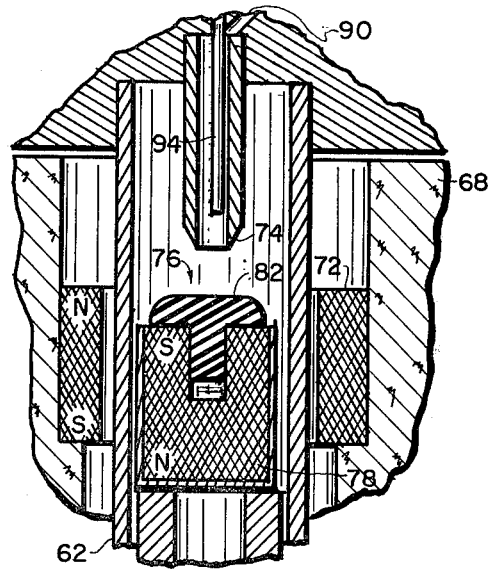
FIG. 6 is a fragmentary cross-sectional view of a pilot valve and float after the reversal of the magnetic polarity and during the downward movement of the float due to discharge of accumulated liquid from the reservoir.

The operation of the pilot valve to accomplish the opening and closing of the valve 34 may be understood by referring to FIGS. 4 through 6. Referring to FIG. 4, taken together with FIG. 2, the pilot valve is shown when the float 68 is in its lowest position as established by the float stop 70 (see FIG. 2) or is rising in the reservoir. The spacing of the float stop 70 and the valve plug stop 84 are such that magnets 72 and 78 are always magnetically coupled such that their normal reverse polarity (as indicated) causes the valve plug 76 to be raised firmly against seat 74. Thus, the sealing member 82 is firmly forced against the valve seat 74. As discussed above, this maintains the drain valve 34 (see FIG. 2) in a closed position. As indicated, the magnetic force F is in an upward direction in this position.

Referring now to FIG. 5, this illustrates the float 68 in the most upward position; that is, against the under surface of the header 46. When in this position, the magnets 72 and 78 are substantially aligned in height. The magnetic field generated within magnet 72 causes an effective reversal in the polarity of the magnetic field within magnet 78. This effective reversal is not instantaneous due to the hysterisis of the magnet 78. However, when polarity is effectively reversed, the magnetic force F is effectively directed downwardly whereby the valve plug 76 is removed from the valve seat 74 to rest against the stop 84. Air pressure within the valve seat 74 is thereby released around the periphery of the valve plug 76 and is permitted to exit through channel 86 and passageway 88. As discussed above, this permits an opening of drain valve 34 whereby the float 68 is lowered to the initial position as shown in FIG. 4. At the lowest position of float 68 within the reservoir, the polarity of magnet 78 is again effectively reversed bringing about conditions whereby the valve plug 76 is again forced against the valve seat 74. The intermediate condition wherein the float is in an elevated position, but dropping as the pilot valve is opened, is illustrated in FIG. 6.

Figure 8:
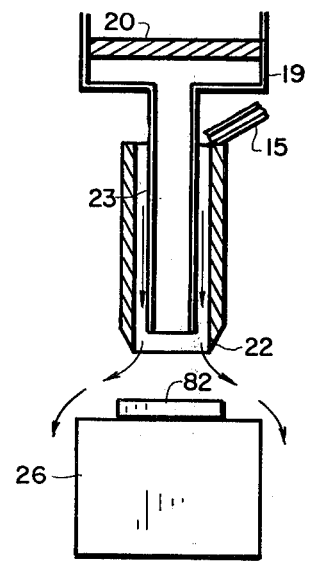
FIG. 8 is a schematic drawing further illustrating the operation of the pilot valve of the subject drain valve system.

It will be recognized that the magnet polarity reversal which occurs at the top and bottom extreme travel of the float 68, and the delay imparted by the hysterisis during this reversal, operates the pilot valve in a "snap on" and "snap off" manner. It is essential that the pilot valve operate reliably whenever the float 68 reaches an exact position within the reservoir. The particular construction shown in FIG. 2 has been found to provide this reliable operation. The specific operation thereof may be explained in more detail by reference to FIG. 8. As discussed above with reference to FIG. 1, when the valve plug 26 is in position such that its cap 82 is against the valve seat 22, regulated air pressure entering through line 15 creates an equal pressure in capillary 23. This pressure within capillary 23 causes the piston 20 in control valve operator 19 and the piston rod 21 attached thereto to move the aforementioned control valve 17 (see FIG. 1) in a direction to provide the needed air pressure to the drain valve operator to maintain the drain valve in the closed position.

However, when the valve plug 26 is rapidly removed downwardly away from the valve seat 22 by the operation of the aforementioned magnets, the air flowing through line 15 is vented through the valve seat 22. This venting of the air creates a venturi action about the capillary 23 which causes a rapid decrease of the pressure therein. This reduction of internal pressure within the capillary 23 causes the piston 20 and the piston rod 21 of the control valve operator to move axially (downwardly in this FIG. 8) so as to move the control valve and reverse the application of pressure to the drain valve operator. When the valve plug 26 rises to fully contact the valve seat 22 the pressure in capillary tube 23 is substantially increased giving a positive action of valve 17 and thus to the drain valve 34. This combined rapid operation of the pilot valve and the control valve operator 19 occurs at precise times for each operation of the pilot valve and thereby assures that the reservoir will not overfill nor drain at a time prior to substantial filling.

The rapid and complete manner of operation of the components is important to the operation of the present invention for several reasons. The main benefit of the rapid operation is in the corresponding rapid operation of the piston within the cylinder 28. The air supply provided to the volume above the piston 30 through port 114 is multiplied by the area of the piston whereby considerable force is available to move the piston rod 32 axially away from cylinder 28, and the connecting rod 33 rapidly operates valve 34 for the draining of the reservoir. Through rapid operation of this valve, full flow condition exists quickly whereby all contents of the reservoir are forced through valve by the pressure of the pneumatic system to which the subject invention is attached. This assures a rapid and complete removal of the contents of the reservoir brought about by the pressure in the pneumatic system. Again, when the reservoir is empty, the valve 34 is rapidly closed thereby minimizing any erosion of its components or the accumulation of residual material exiting from the reservoir. Since the valve 34 is a rotary valve and power assisted, any foreign material that may be present is cleared from the surfaces and thereby cannot prevent the valve from closing as in the case of an axially moving valve.

Figure 7:
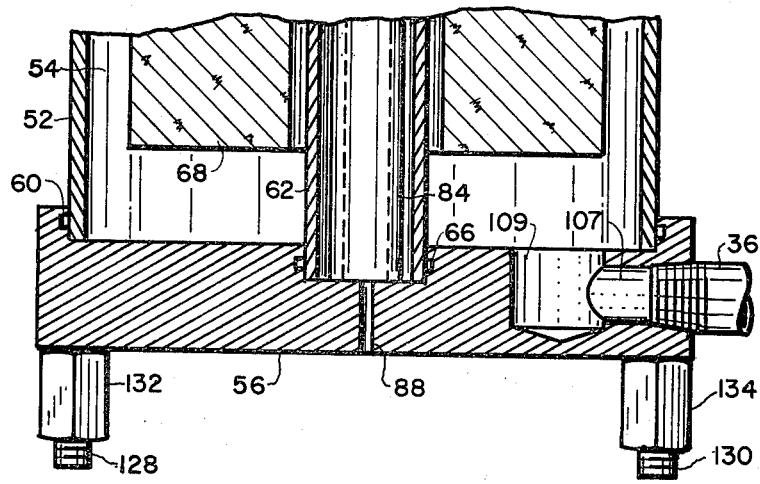
FIG. 7 is a fragmentary cross-sectional view of another embodiment of the lower portion of the reservoir of the subject drain valve system.

Another embodiment of the reservoir portion of the present invention is illustrated in FIG. 7. In this embodiment, the cylindrical wall 52 of the reservoir is shortened such that the float stop 70 (see FIG. 2) is not required. Alternately, the float 68 may be lengthened accordingly such that the bottom plate 56 forms the bottom stop for the float. This particular construction has the advantage that when the float 68 reaches its lowermost travel, that is, against the top of the bottom plate 56, the float closes the opening to sump 109. This closure of sump 109 further enhances the shut off of the fluid flow out through passageway 107 and connector 36 leading to the drain valve (not shown). This construction principally prevents undue air pressure from leaving the reservoir prior to the automatic closing of the rotary valve. Shown also in FIG. 7 are the typical bolts 128, 130, and the respective nuts 132, 134 that are utilized for holding the reservoir together.

From the foregoing description, it will be recognized that an improved automatic drain system has been provided for a reservoir used for the accumulation of condensables and other foreign materials in pneumatic systems. The principal advantages are provided by the two magnets whereby their normal opposite polarity maintains the pilot valve in a closed position and the drain valve in a closed position throughout movement of the float in an upward direction. When the float reaches the uppermost level, the polarity of one of the magnets (e.g. the magnet within the valve plug) is effectively reversed and this reversed polarity is maintained throughout the descent of the float within the reservoir thereby maintaining the drain valve in a fully opened position throughout the downward travel of the float. Reliable operation of the pilot valve is assured by the coaxial construction within the valve seat portion. The drain valve is external to the pressure vessel, i.e. the reservoir, and is less sensitive to the material contained within the reservoir. Also, the pilot valve is isolated from the contents of the reservoir. Both the drain valve operator and the pilot valve are operated by a separate filtered air supply. Their operation is dependable in contrast to being operated by the pneumatic system itself which may contain impurities. The snap action of both of the valves provides for a positive shut off every cycle of the filling and draining from the reservoir.

It will be further recognized that the pilot valve construction as described above operated by the two magnets will have application to other systems. For example, the float may be in any type of reservoir from which it is desired to release the contents when the reservoir is substantially full. In such instance, the same pilot valve and its associated mangets will be useful to produce a pneumatic signal for other types of draining mechanisms. Still other applications of the pilot valve as operated by the coaxial magnets will be apparent to those versed in the art.

Discussed hereinabove is the automatic draining of the reservoir when it is full. There are, however, situations when the draining operation may be desired at less than full capacity of the reservoir. Accordingly, an "override" may be provided whereby the drain valve 34 will open for the draining operation. Such an override control may be, for example, a valve (not shown) to remove the input pressure to the regulator 14 (FIG. 1). The resultant reduction of pressure to the operator 19 of valve 17 would bring about opening of the drain valve. Other means of providing for opening the drain valve upon command will be apparent to those skilled in the art.

Moreover, it will be noted that rotary valve 34 does not throttle. That is, it is fully open when the float 68 is at the high switching position (see FIG. 5) and stays fully open till the float is at the low switching position shown in FIG. 4.

It is of course understood that although a preferred embodiment of the present invention has been illustrated and described various modifications thereof will become apparent to those skilled in the art. Accordingly, the scope of the invention should only be defined by the appended claims and the equivalents thereof.

I claim:

1. An automatic drain valve system for filter traps used in the accumulation of condensables and foreign materials present in a pneumatic system, which comprises:

a housing provided with an inlet and an outlet for flow-through communication with said pneumatic system;

a reservoir attached to said housing and communicating with said housing for collecting said condensables and foreign material, said reservoir provided with a sump at the lowest level thereof;

a vertical sleeve mounted within said reservoir and sealed against communication with said reservoir, said sleeve been provided with an air discharge passageway extending externally to said reservoir;

a pilot valve mounted axially within a top portion of said sleeve, said pilot valve comprising a fixed annular seat at an end of a sensor tube and an axially moving valve plug cooperating with said seat;

an annular buoyant float respondable to liquid in said reservoir surrounding said sleeve and slidable along said sleeve from a low position to a high position;

an annular magnet of one polarity mounted in said float proximate said sleeve;

a second magnet mounted in said valve plug having a magnetic coupling with said annular magnet from said low position to said high position of said float, said second magnet normally having a polarity opposite the polarity of said annular magnet;

a drain valve for said reservoir mounted external to said reservoir, said drain valve having an inlet and an outlet, said inlet communicating with said sump of said reservoir;

a pneumatic valve operator mounted on said housing external to said reservoir and attached to said drain valve for the opening and closing of said drain valve; and pneumatic means connected between said pilot valve and said valve operator whereby said valve operator quickly opens said drain valve when said float reaches said high position and quickly closes said drain valve when said float reaches said low position.

2. The drain valve system of claim 1 further comprising separator means within said housing intermediate said inlet and said outlet for separating condensables and foreign materials from air flowing in said pneumatic system, said separator means communicating with said reservoir.

3. The drain valve system of claim 1 wherein said magnetic coupling causes said polarity of said second magnet to be effectively reversed to match the polarity of said annular magnet when said float reaches said high position and to again become the opposite polarity from said annular magnet when said float reaches said low position.

4. The drain valve system of claim 1 further comprising a float stop within said reservoir and a plug valve stop within said sleeve to effect said magnetic coupling between said annular magnet and said second magnet at said low position.

5. The drain valve system of claim 1 wherein said drain valve is a rotary valve and wherein said pneumatic valve operator comprises a cylinder, a piston within said cylinder, and a piston rod connected between said piston and an operating lever on said drain valve.

6. The drain valve system of claim 5 wherein said pneumatic means connected between said pilot valve and said drain valve operator comprises:

a pressure regulator having an inlet and an outlet;

a proximity valve provided with an inlet port, a first and a second outlet port, at least one vent port and a pneumatic operator connected to a slidable plug within said proximity valve, said slidable plug adapted to selectively connect said inlet port to one of said output ports and said vent port to the other of said output ports;

a source of filtered air connected to said inlet port and to said inlet of said regulator;

a capillary tube mounted coaxially within said pilot valve sensor tube terminating proximate said pilot valve seat;

a first conduit connecting said regulator with an annular space between said capillary tube and said pilot valve sensor tube;

a second conduit connecting said capillary tube with said proximity valve operator;

a third conduit connecting said first output port of said proximity valve to said cylinder above said piston; and a fourth conduit connecting said second output port of said proximity valve to said cylinder below said piston.

7. The drain valve system of claim 5 wherein said proximity valve causes said source of filter pressurized air to be connected to said fourth conduit and said third conduit to said vent port when pressure in said second conduit is substantially equal to pressure in said first conduit, and causes said source of filtered pressurized air to be connected to said third conduit and said fourth conduit to said vent port when said pressure in said second conduit is substantially less than said pressure in said first conduit.

8. The drain trap system of claim 1 wherein said reservoir is releasably attached to said housing, said reservoir comprising a cylindrical wall, a bottom plate attached to said wall, and first sealing means between said wall and said housing.

9. The drain trap system of claim 8 wherein said bottom plate is releasably attached to said wall and further comprises second sealing means between said wall and said bottom plate.

10. The drain trap system of claim 9 wherein said sleeve is centered within said reservoir and is releasably sealed to said housing and to said bottom plate.

11. The drain trap system of claim 1 wherein said float closes said sump of said reservoir when said float is in said low position within said reservoir.

12. An automatic drain system for reservoirs containing liquids, which comprises:

a vertical sleeve mounted within said reservoir and sealed against the communication with said reservoir, said sleeve being provided with an air discharge passageway extending externally to said reservoir;

an annular buoyant float respondable to liquid level in said reservoir surrounding said sleeve;

an annular magnet of one polarity mounted in said float proximate the top thereof;

a pilot valve mounted axially within a top portion of said sleeve, said pilot valve comprising a fixed annular seat and an axially moving valve plug cooperating with said seat;

a second magnet mounted in said plug valve having a magnetic coupling with said annular magnet from a low position to a high position of said float, said second magnet normally having a polarity opposite the polarity of said annular magnet;

a source of pressurized filtered air connected to the interior of said pilot valve seat;

an operator of a valve connected to a coaxial capillary tube extending along the axis of said pilot valve seat; and pneumatic means connected to said valve for the operation of a drain connected to said reservoir.

13. The drain trap system of claim 1 wherein said drain valve is fully open when said float is at the high position and wherein said drain valve stays fully open until said float is at the low position.

* * * * *